FLEXODE CROSSPOINT ADAPTIVE MATRIX CIRCUITS

Filed Oct. 29, 1965 2 Sheets-Sheet 1

| INPUTS | | | | OUTPUT | | | |
|---|---|---|---|---|---|---|---|
| 47 | 48 | 49 | 50 | 43 | 44 | 45 | 46 |
| 1 | 1 | 0 | 0 | 1 | 0 | 0 | 0 |
| 0 | 1 | 1 | 0 | 0 | 1 | 0 | 0 |
| 0 | 0 | 1 | 1 | 0 | 0 | 1 | 0 |
| 1 | 0 | 0 | 1 | 0 | 0 | 0 | 1 |

| INPUTS | | | | OUTPUT | | | |
|---|---|---|---|---|---|---|---|
| 47 | 48 | 49 | 50 | 43 | 44 | 45 | 46 |
| 1 | 1 | 0 | 0 | 0 | 1 | 0 | 0 |
| 1 | 0 | 1 | 0 | 1 | 0 | 0 | 0 |
| 0 | 0 | 1 | 1 | 0 | 0 | 0 | 1 |
| 1 | 0 | 0 | 1 | 0 | 0 | 1 | 0 |

INVENTORS
RONALD B. SCHILLING &
CHARLES M. WINE
By John T. O'Halloran
Attorney

INVENTORS
RONALD B. SCHILLING &
CHARLES M. WINE
By John T. O'Halloran
Attorney 3,465,292

FLEXODE CROSSPOINT ADAPTIVE MATRIX CIRCUITS

Ronald B. Schilling, East Brunswick, and Charles M. Wine, Princeton, N.J., assignors to RCA Corporation, a corporation of Delaware Filed Oct. 29, 1965, Ser. No. 505,685
Int. Cl. H04q *1/18*
U.S. Cl. 340—166 4 Claims

ABSTRACT OF THE DISCLOSURE

An adaptive matrix includes a plurality of column and row conductors having an adaptive semiconductor device coupled between each column and row conductor. Each of the semiconductor devices is adaptive to operate in a first operating state, wherein the device functions as a diode, or in a second operating state, wherein the device functions as a high impedance or substantially open circuit. Selected devices are adapted to operate as diodes by applying an energizing signal of one polarity thereto and the remaining devices are adapted to operate as open circuits by applying an energizing signal of one polarity thereto and the remaining devices are adapted to operate as open circuits by applying an energizing signal of an opposite polarity thereto. The matrix therefore exhibits one particular coding form that may be changed to a different coding form by readapting the semiconductor devices.

Adaptive matrix circuits are matrix circuits that include adaptive semiconductor devices for interconnecting the row and column conductors in the matrix. Adaptive semiconductor devices are circuit elements whose structure and characteristics undergo controlled changes in response to particular conditions and then remain reasonably constant with respect to other conditions. Thus, adaptive semiconductor devices exhibit one set of operating characteristics at one time and then may be adapted or changed so as to exhibit a second set of operating characteristics at another time. The operating characteristics of adaptive semiconductor devices remain substantially constant until the devices are again deliberately changed. Adaptive devices are particularly useful in matrix circuits because the matrix coding or pattern may be changed as desired. Heretofore, matrix circuits required either mechanical or optical changes to be rendered adaptive. Circuits requiring mechanical changes have found limited use because of their bulky size and other undesirable characteristics. Matrix circuits requiring optical changes utilized photosensitive devices and have the disadvantage of requiring means for channeling light to varying locations in the matrix. Such circuits also are not permanently adapted but require the application of biasing signals to remain in a particular adaptive state.

Accordingly, it is an object of this invention to provide a new and improved adaptive matrix circuit.

It is another object of this invention to provide a matrix circuit that may be adapted from one coding pattern to any of a plurality of other coded patterns by electrical means.

A matrix circuit embodying the invention includes a plurality of column and row electrical conductors. A plurality of adaptive semiconductor devices are provided to couple each row conductor to each column conductor. Each of the adaptive devices may be adapted electrically to operate either in a first operating state, wherein the device functions as a diode, or in a second operating state, wherein the device functions as a high impedance or substantially an open circuit. Electrical adapting means including an energizing source and switching means are coupled to adapt selected ones of the semiconductor devices to operate as diodes by applying an energizing signal of one polarity thereto and to adapt the remaining devices to operate as open circuits by applying an energizing signal of an opposite polarity thereto. The matrix therefore exhibits one particular coding form that may be changed to a different coding form by switching the adapting means to readapt the devices.

Figures 1, 4, 5:
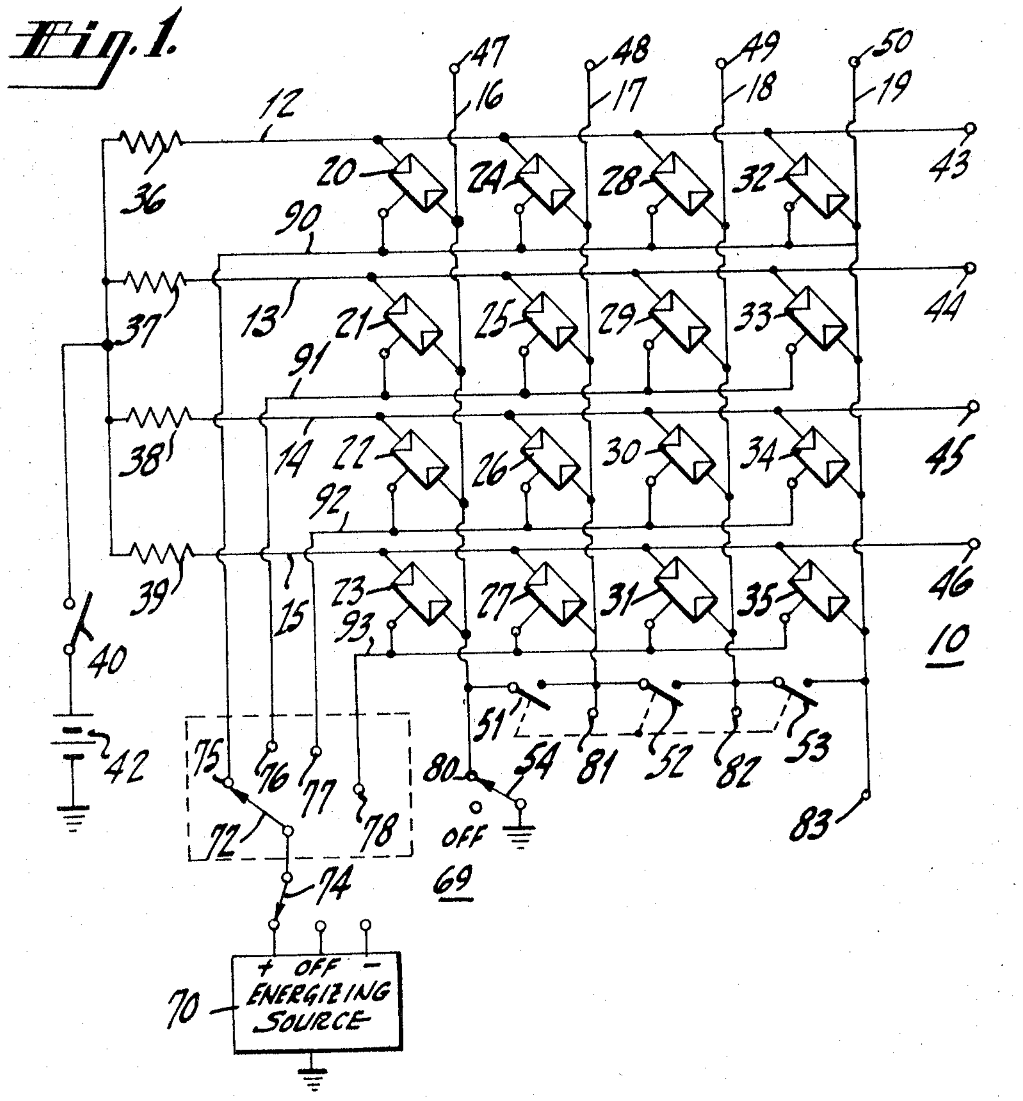
FIGURE 1 is a schematic circuit diagram of an adaptive matrix circuit in accordance with the invention.
FIGURES 4 and 5 are tables summarizing, respectively, the operation of the matrices of FIGURES 3 and 4.

Referring now to FIGURE 1, an adaptive semiconductor matrix circuit 10 includes a plurality of row electrical conductors 12 through 15 and a plurality of column electrical conductors 16 through 19. Although a 4 x 4 matrix is illustrated for convenience in the drawing, it is to be noted that the matrix need not be limited to any particular configuration. Each one of the column conductors 16–19 is coupled to each one of the row conductors 12–15 through one of a plurality of adaptive semiconductive devices 20 through 35.

An adaptive semiconductor device that may be utilized for the devices 20–35 as disclosed in an application entitled Semiconductor Device for John O. Kessler, Ser. No. 407,801, filed Oct. 30, 1964, and assigned to the same assignee as the present application. A particular adaptive semiconductor device that may be utilized in the two-junction device shown in FIGURE 3 of the above-identified application. The adaptive semiconductor devices described in that application were termed "flexodes" therein and this terminology is continued in this application. Briefly, a single junction flexode is a semiconductor device that may be adapted to exhibit the current-voltage characteristic of a semiconductor diode in one operating state and then adapted to exhibit the current-voltage characteristic of a resistance. A two-junction flexode is similar to a pair of diodes connected back-to-back and may be adapted to exhibit the characteristic of a diode in one operating state and a high impedance, that substantially constitutes an open circuit, in another operating state. While the above-identified patent application discloses a variety of adaptive circuits, an adaptive matrix utilizing a two-junction flexode is not disclosed therein.

Flexodes are adapted from one operating state to the other by applying heat and an electric potential to the devices. The heat may be applied from an external heat source or, more importantly, may be produced by a current caused to flow through the device by an electric potential applied thereto. When the potential is applied in one direction, a junction of a flexode exhibits the characteristic of a diode, whereas the potential is applied in the reverse direction, a junction of a flexode exhibits the characteristic of a resistance.

Each of the row conductors 12–15 has one end thereof coupled through one of a plurality of resistors 36 through 39 to one terminal of a single-pole, single-throw switch 40. The other terminal of the switch 40 is coupled to the positive potential terminal of a power supply 42. The negative potential terminal of the power supply 42, which is illustrated as a battery in FIGURE 1, is connected to a point of reference potential or circuit ground. The other ends of the row conductors 12–15 comprise the output terminals 43 through 46 for the matrix 10. One end of each of the column conductors 16–19 comprises the input terminals 47 through 50 for the matrix 10.

When input signals are applied to the input terminals 47–50, the other ends of the column conductors 16–19 are all connected serially together through switches 51, 52 and 53 to one terminal of a multiposition selector switch 54, the center terminal of which is grounded. The switches 51, 52 and 53 may be ganged together to open and close simultaneously.

To adapt the flexodes 20–35 to their first or second operating states, electrical adapting means 69 is coupled to the matrix 10. The adapting means 69 includes an energizing source 70 that is coupled through a selector switch 72 as well as a single-pole, double-throw switch 74 to adapt the flexode devices. The adaptive energizing source 70 includes both a positive and a negative potential output and is coupled through the switch 74 to the common terminal of the multiposition selector switch 72. Each of the two-junction flexodes 20–35 includes an ohmic connection made to the substrate thereof and which is coupled to the adapting means 69. The substrate connection of the top row of flexodes are coupled through a conductor lead 90 to a terminal 75 of the selector switch 72. The substrate connections of the next three rows of flexodes are coupled through the separate conductors 91, 82 and 93 to the terminals 76, 77 and 78, respectively, of the selector switch 72. To complete the circuit through each flexode 20–35, each column conductor 16–19 is coupled to one of the terminals 80–83 of the switch 54.

The flexodes 20–35 as well as the row and column conductors may be fabricated in integrated form. Since every junction between a row and a column conductor incorporates a flexode, simple mass production techniques are possible in manufacturing the matrix circuits. To select a particular coding or pattern in the matrix 10 during the operation of the circuit, the adapting circuit 69 is first connected to the matrix 10. It is assumed that a coding such as that shown in FIGURE 2 is to be selected.

Both the upper and lower junctions of all of the flexodes are initially adapted to exhibit the characteristics of a diode. This may be accomplished during manufacturing. The lower junction of each flexode 20–35 is then adapted to exhibit either rectifying or resistive characteristics, whereas the upper junctions are maintained as diodes. When a lower junction is adapted to exhibit a resistive characteristic, the flexode operates as a diode. When a lower junction is adapted to exhibit a diode characteristic, the flexode operates as a substantially open circuit since effectively two diodes are connected back-to-back. It is this diode and open circuit capabilities of a flexode which makes the device particularly suitable for matrix circuits.

Figure 2:
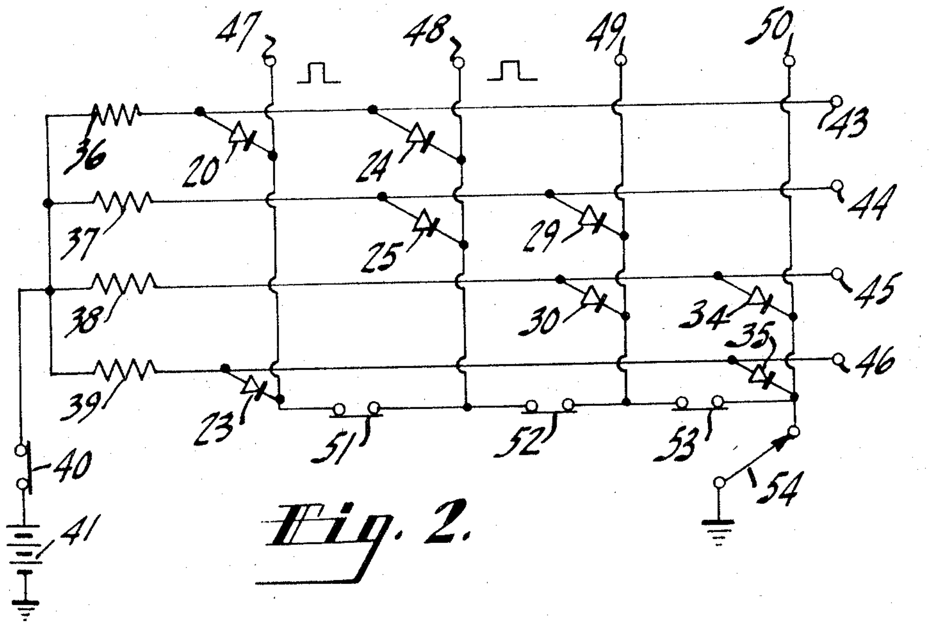
FIGURES 2 and 3 are matrices exhibiting selected coding forms.

To select the coding of FIGURE 2, the selector switch 72 is moved to the terminal 75 and the selector switch 54 is moved to the terminal 80. The positive terminal of the energizing source 70 is then connected into the circuit by the switch 74 to provide an adapting positive potential. The reverse potential is applied across the lower junction of the flexode 20 through the conductor 90 and the column conductor 16. The reverse potential adapts this junction to exhibit the operating characteristics of a resistor. This causes the overall flexode 20 to exhibit the operating characteristics of a diode. The selector switch 54 is then moved to the second position 81 to similarly adapt the flexode 24 to operate as a diode. When the selector switch 24 is moved to the position 82, the switch 74 is connected to the negative terminal of the adaptive energizing source 74 so as to maintain the lower junction of the flexode 28 operating as a diode to cause the flexode 28 to function as an open circuit. The flexode 28 when operating as an open circuit exhibits a high impedance, as for example 200,000 ohms. When a flexode is operating as a diode, a small resistance on the order of 200 ohms is introduced by the lower resistive junction. The flexodes in FIGURE 2 that function as diodes are shown schematically as such, whereas the flexodes that function as open circuits are omitted from this figure. The adapting means 69 is then repeatedly changed to adapt each of the devices 20–35 to the matrix coding shown in FIGURE 2.

Once the matrix 10 is coded as in FIGURE 2, the switch 74 is thrown to the off position to disconnect the power supply 70 from the matrix 10. The switches 51, 52 and 53 are all closed to ground all of the column conductors 16–19. The switch 40 is then closed to provide energizing potential to the matrix 10. Pairs of input signals are applied to the terminals 47–50, and output signal in accordance with the table shown in FIGURE 4 appear at the output terminals 43–46. The input signals and the level of energizing source 42 are not high enough to change or adapt the matrix 10.

Figure 3:
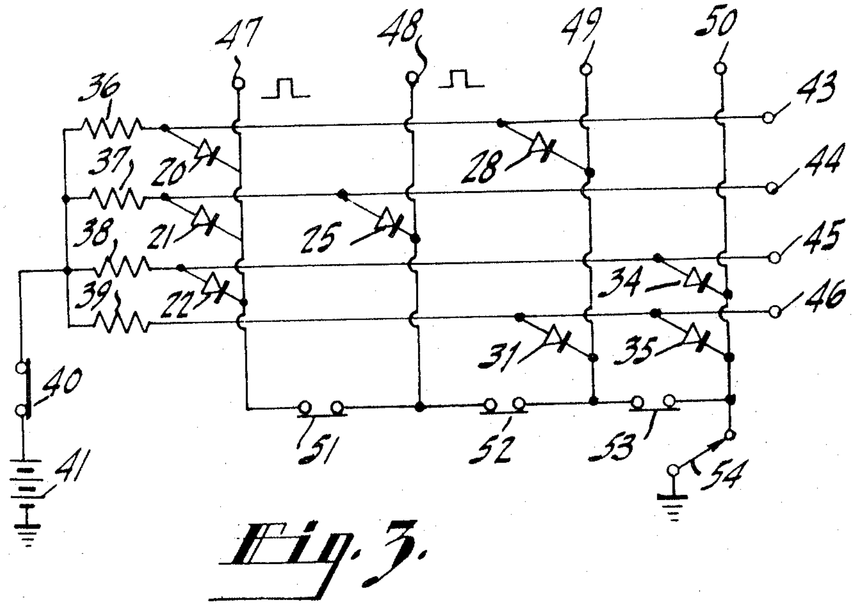

If it is desired to change the coding of the matrix 10 to that shown in FIGURE 3, the matrix can be changed electrically by switching the source 42 out of the circuit and switching the adapting means 69 into the circuit. No mechanical changes need to be made nor need the matrix 10 itself be entered to modify the coding. Thus, the adaptation may be done remotely from the matrix 10.

To obtain the coding of FIGURE 3, the flexode 24 is adapted to its open circuit state by switching the selector switch 72 to the position 75 and the switch 54 to the position 81 and applying a forward bias potential to the lower junction of this flexode by connecting the switch 74 to the negative terminal of the source 70. The forward bias potential causes the lower junction of the flexode 24 to change from functioning as a resistance to function as a diode. With both junctions of the flexode 24 functioning as diodes, the flexode 24 functions substantially as an open circuit. The flexode 28 then has a reverse bias potential applied to its lower junction to adapt this junction to operate in its resistive state and cause the flexode 28 to operate as a diode. The other flexodes in the matrix pattern shown in FIGURE 3 results. The adapting means 69 is then switched out of the circuit and the energizing source 42 switched back into the circuit. Input signals applied to the terminals 47–50 in accordance with the table shown in FIGURE 5 cause the output signals shown in this table to appear at the output terminals 43–46. Thus, it is apparent that the matrix 10 functions as a code translator and the translation may be adapted or changed as desired. The adaption may be done automatically under the control and program of a computer thereby providing program emulation as well as code translation.

Thus, a matrix embodying the invention may be adapted electrically to change from one coding to another as desired. No expenditure of energy is needed to maintain the adaptive devices in a particular operating state because the devices exhibit relatively constant characteristics until readapted.

What is claimed is:

1. An adaptive matrix circuit, comprising in combination, a plurality of column and row conductors, means for applying input signals to selected conductors, a plurality of adaptive semiconductor devices for coupling each column conductor to each row conductor, each adaptive semiconductor device being adaptable to operate in one of a rectifying and a substantially open circuit state, and adapting means coupled to said devices for adapting selected ones to operate in said rectifying state and adapting the others to operate in said open circuit state in the presence of said input signals.

2. An adaptive matrix circuit in accordance with claim 1 wherein said adapting means comprises, means for applying adapting energy to said device, and selective switching means for coupling said adapting energy to said devices.

3. An adaptive switching circuit, comprising in combination, a plurality of column and row conductors, a plurality of adaptive semiconductor flexodes for coupling each column conductor to each row conductor, each adaptive flexode being adaptable to operate in one of a rectifying and a substantially open circuit state, a source of adapting energy providing a positive potential and a negative potential, and selective switching means for coupling said source to said flexodes for applying one of said potentials to adapt selected ones of said flexodes to operate in said rectifying state and for applying the other of said potentials to adapt the remaining of said flexodes to operate in said open circuit state.

4. An adaptive matrix circuit in accordance with claim 2 wherein said selective switching means is adjustable to readapt said adaptive semiconductor devices to alter the operating states of predetermined ones of said devices.

References Cited

UNITED STATES PATENTS

| | | | |
|---|---|---|---|
| 2,889,537 | 6/1959 | Elliott | 340—166 |
| 2,913,704 | 11/1959 | Huang | 340—166 |
| 3,015,697 | 1/1962 | Klinkhamer | 340—166 X |

JOHN W. CALDWELL, Primary Examiner

HAROLD I. PITTS, Assistant Examiner

U.S. Cl. X.R.

179—18; 307—241; 340—176, 347

UNITED STATES PATENT OFFICE

CERTIFICATE OF CORRECTION

Patent No. 3,465,292 Dated September 2, 1969

Inventor(s) Ronald B. Schilling and Charles M. Wine

It is certified that error appears in the above-identified patent and that said Letters Patent are hereby corrected as shown below:

In column 1, line 23, cancel beginning with "one polarity thereto" to and including "an energizing signal of". Column 2, line 33, "in" should read --is--; line 57, after whereas insert --when--. In column 3, line 24, the reference numeral "82" should read --92--. In column 4, line 11, "signal" should read --signals--; line 35, after matrix insert --10 are adapted in a similar manner until the coding---.

SIGNED AND SEALED

SEP 29 1970

(SEAL)
Attest:

Edward M. Fletcher, Jr.
Attesting Officer

WILLIAM E. SCHUYLER, JR.
Commissioner of Patents